US010256715B2

(12) United States Patent
Nate (10) Patent No.: US 10,256,715 B2
(45) Date of Patent: Apr. 9, 2019

(54) SWITCHING POWER SUPPLY DEVICE

(71) Applicant: Rohm Co., Ltd., Kyoto (JP)

(72) Inventor: Satoru Nate, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 15/548,131

(22) PCT Filed: Jan. 15, 2016

(86) PCT No.: PCT/JP2016/051099
§ 371 (c)(1),
(2) Date: Aug. 2, 2017

(87) PCT Pub. No.: WO2016/125561
PCT Pub. Date: Aug. 11, 2016

(65) Prior Publication Data
US 2018/0026523 A1   Jan. 25, 2018

(30) Foreign Application Priority Data

Feb. 6, 2015   (JP) .................... 2015-022401

(51) Int. Cl.
*H02M 1/36* (2007.01)
*H02P 27/04* (2016.01)
(Continued)

(52) U.S. Cl.
CPC ......... *H02M 1/36* (2013.01); *H02M 3/33523* (2013.01); *H02M 3/33576* (2013.01);
(Continued)

(58) Field of Classification Search
CPC ..... H02M 1/36; H02M 3/33576; H02P 27/04; H05B 33/0815; H05B 33/0845
(Continued)

(56) References Cited

U.S. PATENT DOCUMENTS

| 2007/0086223 | A1 | 4/2007 | Uchida |
| 2012/0195075 | A1* | 8/2012 | Nate ................ H02M 1/36 |
| | | | 363/21.01 |
| 2015/0131334 | A1 | 5/2015 | Saji et al. |

FOREIGN PATENT DOCUMENTS

| JP | H07-30592 U | * | 6/1995 |
| JP | 2005-073469 | | 3/2005 |

(Continued)

OTHER PUBLICATIONS

Japanese Patent Office, International Search Report for PCT/JP2016/051099, dated Apr. 12, 2016, with English translation.

*Primary Examiner* — Kawing Chan
*Assistant Examiner* — Bradley Brown
(74) *Attorney, Agent, or Firm* — Fish & Richardson P.C.

(57) ABSTRACT

A switching power supply device having: a power supply terminal VCC connected to one end of an output capacitor Co2; a high-voltage terminal VH connected to the input side of an input voltage Vdc; and a starting circuit 101 provided between the power supply terminal VCC and the high-voltage terminal VF, the starting circuit 101 passing a first current for charging the output capacitor Co2 via the power supply terminal VCC. The switching power supply device is provided with: a control circuit 10 for turning a switching element M1 on and off; and a current-supplementing circuit 30 to which the input voltage Vdc is inputted, the current-supplementing circuit 30 being connected to the high-voltage terminal VH, the current-supplementing circuit 30 passing a second current to the output capacitor side on the basis of the first current. A load L2 can be connected to the other end of the output capacitor.

8 Claims, 8 Drawing Sheets

(51) Int. Cl.
*H05B 33/08* (2006.01)
*H02M 3/335* (2006.01)
*H02M 1/00* (2006.01)

(52) U.S. Cl.
CPC ......... *H02P 27/04* (2013.01); *H05B 33/0815* (2013.01); *H05B 33/0845* (2013.01); *H02M 2001/0006* (2013.01)

(58) Field of Classification Search
USPC ....................................................... 318/504
See application file for complete search history.

(56) References Cited

FOREIGN PATENT DOCUMENTS

| | | | |
|---|---|---|---|
| JP | 2005073469 A | * | 3/2005 |
| JP | 2007-116789 | | 5/2007 |
| JP | 2012-161117 | | 8/2012 |
| JP | 2014-110696 | | 6/2014 |
| JP | 2014110696 A | * | 6/2014 |
| WO | 2014/006838 | | 1/2014 |

\* cited by examiner

SWITCHING POWER SUPPLY DEVICE

TECHNICAL FIELD

The present invention relates to switching power supply devices.

BACKGROUND ART

There have conventionally been developed various switching power supply devices such as AC/DC converters and DC/DC converters. Patent Document 1 identified below discloses a DC/DC converter as described below.

The DC/DC converter includes: a transformer including a primary winding to one end of which an input voltage is applied, a secondary winding, and an auxiliary winding provided on the primary side; a switching transistor provided on the path of the primary winding; an output capacitor having the potential at its one end fixed; a diode provided between the other end of the output capacitor and one end of the auxiliary winding with its cathode on the output-capacitor side; and a control circuit (control IC) controlling the switching transistor between ON and OFF.

The control circuit includes: a power terminal connected to the other end of the output capacitor; a HIGH-voltage terminal to which the input voltage is fed; and a charge transistor provided between the HIGH-voltage terminal and the power terminal.

The control circuit further includes: a current limiting circuit that, in a first state where the voltage at the power terminal is lower than a first threshold voltage, limits the charge current passing from the HIGH-voltage terminal to the power terminal through the charge transistor and that, in a second state where the voltage at the power terminal is higher than a second threshold voltage set higher than the first threshold voltage, reduces the charge current down to substantially zero.

The DC/DC converter mentioned above operates as follows. Immediately after the power supply is started up when the voltage at the power terminal is lower than the first threshold voltage, that is, in the first state, the charge current is limited, and the supply voltage rises gently. When the voltage at the power terminal exceeds the first threshold voltage, the charge current increases, and the voltage at the power terminal rises faster. When the voltage at the power terminal exceeds the second threshold voltage, the charge current is reduced down to substantially zero. At this point, the control circuit starts up, and starts to control the switching transistor between ON and OFF. Thus, the voltage at the power terminal is stabilized by an auxiliary converter including the auxiliary winding, the diode, and the output capacitor.

LIST OF CITATIONS

Patent Literature

Patent Document 1: Japanese Patent Application published as No. 2012-161117

SUMMARY OF THE INVENTION

Technical Problem

Inconveniently, the DC/DC converter of Patent Document 1 mentioned above presupposes only a load connected on the secondary side of the transformer and not a load connected on the primary side at the same time. That is, with the load connected to the other end of the output capacitor, even when the power supply is started up, the charge current is consumed by the load, and no charge current is fed to the output capacitor, which thus cannot be changed; thus, the voltage at the power terminal does not rise, and the control circuit cannot be started up, which is a problem.

This may be coped with by increasing the size of the charge transistor and increasing the charge current, but that leads to new problems such as the generated heat and the limit to increasing the size while securing a high withstand voltage.

In view of the problems mentioned above, an object of the present invention is to provide a switching power supply device that can start up even with a load connected on the primary side of a transformer.

Means for Solving the Problem

To achieve the above object, according to one aspect of the present invention, a switching power supply device includes:

a transformer including:
  a primary winding to one end of which an input voltage is applied;
  a secondary winding; and
  an auxiliary winding provided on the primary-winding side;
a switching element provided in the path of the primary winding;
an output capacitor having the potential at its one end fixed;
a rectifying element provided between the other end of the output capacitor and one end of the auxiliary winding, with the cathode of the rectifying element on the output-capacitor side;
a control circuit controlling the switching element between ON and OFF, the control circuit including:
  a power terminal connected to the other end of the output capacitor;
  a HIGH-voltage terminal connected to the input side of the input voltage; and
  a start-up circuit provided between the power terminal and the HIGH-voltage terminal, the start-up circuit passing a first current for charging the output capacitor via the power terminal; and a current supplementing circuit receiving the input voltage and connected to the HIGH-voltage terminal, the current supplementing circuit passing a second current to the output-capacitor side based on the first current.

Here, a load is connectable to the another end of the output capacitor (a first configuration).

In the first configuration described above, preferably, when as a result of the output capacitor being charged, the voltage at the power terminal exceeds a first threshold voltage, the start-up circuit shuts off the first current, and in response to the first current being shut off, the current supplementing circuit makes the second current substantially zero (a second configuration).

In the second configuration described above, preferably, the current supplementing circuit includes:
  a resistor element to one end of which the input voltage is applied and to the other end of which the HIGH-voltage terminal is connected; and
  a transistor of which the control end is connected to the other end of the resistor element, the transistor having the input voltage applied to the current-in end thereof, the transistor having the current-out end thereof connected to the other end of the output capacitor (a third configuration).

In the third configuration described above, preferably, the transistor is a PNP transistor of which the base is the control end, the emitter is the current-in end, and the collector is the current-out end (a fourth configuration).

In any one of the second to fourth configurations described above, preferably, the start-up circuit includes:

a charge transistor provided between the HIGH-voltage terminal and the power terminal;

a first comparison circuit comparing the voltage at the power terminal with the first threshold voltage; and a switch provided in the path of the charge transistor, the switch being switched according to the result of comparison by the first comparison circuit (a fifth configuration).

In the fifth configuration described above, preferably, the start-up circuit further includes:

a second comparison circuit comparing the voltage at the power terminal with a second threshold voltage lower than the first threshold voltage; and a current source connected in parallel with the switch, the current source limiting a current, and the switch and the current source are switched between ON and OFF according to the results of comparison by the first and second comparison circuits (a sixth configuration).

In the fifth or sixth configuration described above, preferably, the charge transistor is an N-channel MOSFET biased so as to be normally ON (a seventh configuration).

According to another aspect of the present invention, an electronic appliance includes:

a switching power supply device of any one of the first to seventh configuration described above; and a load connected to the other end of the output capacitor in the switching power supply device (an eighth configuration).

In the electronic appliance of the eighth configuration described above, preferably, the switching power supply device is an AC/DC converter, the electronic appliance is an air conditioner further including:

a motor; and a motor driving circuit receiving an alternating-current voltage to drive and control the motor, and the load is a control circuit that controls the motor driving circuit.

In the electronic appliance of the eighth configuration described above, preferably, the electronic appliance is an LED lighting device further including:

an LED load connected on the secondary side of the transformer in the switching power supply device, the control circuit of the switching power supply device has a function of dimming the LED load, and the load is a control circuit that feeds the control circuit with a dimming signal.

Advantageous Effects of the Invention

According to the present invention, a switching power supply device can start up even with a load connected on the primary side of a transformer.

DESCRIPTION OF EMBODIMENTS

Embodiments of the present invention will be described below with reference to the accompanying drawings.

<Configuration of an Electronic Appliance>

Figure 1:
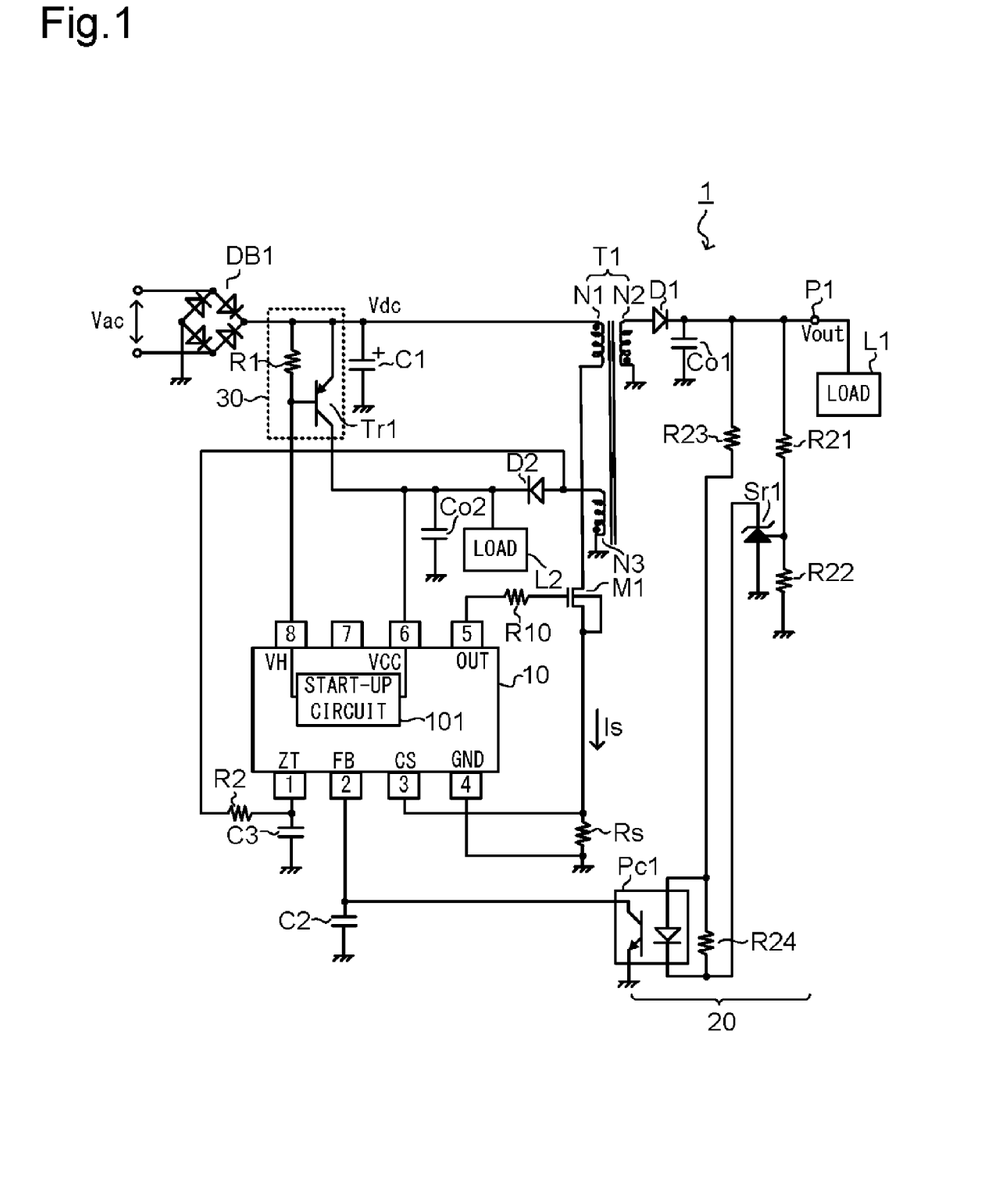
FIG. 1 is a diagram showing the configuration of an electronic appliance according to one embodiment of the present invention.

The configuration of an electronic appliance according to one embodiment of the present invention is shown in FIG. 1. The electronic appliance shown in FIG. 1 includes an AC/DC converter 1, a first load L1 connected to the AC/DC converter 1 on the secondary side of a transformer, which will be described later, and a second load L2 connected to the AC/DC converter 1 on the primary side of the transformer.

The AC/DC converter 1 includes, among others, a diode bridge DB1, a capacitor C1, a transformer T1, a switching transistor M1, a first diode D1, a first output capacitor Co1, a second diode D2, a second output capacitor Co2, a control IC (control circuit) 10, and a feedback circuit 20.

The diode bridge DB1 performs full-wave rectification of an alternating-current voltage Vac, such as a commercial alternating-current voltage, that is fed in. The capacitor C1 smooths the voltage having undergone the full-wave rectification to produce a direct-current voltage Vdc. For example, when Vac=100 V, Vdc=144 V.

The transformer T1 has a primary winding N1, a secondary winding N2, and an auxiliary winding N3 provided on the primary side.

The switching transistor M1, the primary winding N1, the secondary winding N2, the first diode D1, and the first output capacitor Co1 constitute a first converter (main converter). The first converter acts as a flyback DC/DC converter.

One end of the first output capacitor Co1 is grounded. Between the other end of the first output capacitor Co1 and one end of the secondary winding N2, the first diode D1 is provided, with its cathode on the first output capacitor Co1 side. The other end of the secondary winding N2 is grounded.

To one end of the primary winding N1, the direct-current voltage Vdc is applied. The drain of the switching transistor M1, which is an N-channel MOSFET (metal-oxide-semiconductor field-effect transistor), is connected to the other end of the primary winding N1. The source of the switching transistor M1 is connected, via a sense resistor Rs for detecting the current through the switching transistor M1, to an application terminal of a ground potential. The voltage signal appearing at the sense resistor Rs is input to a current sense terminal CS (pin-3) of the control circuit 10.

To the gate of the switching transistor M1, a switching signal output from an output terminal OUT (pin-5) of the control circuit 10 is applied via a resistor R10.

The direct-current voltage Vdc is chopped (broken down) through switching (turning ON and OFF) by the switching transistor M1, and energy is transferred to the secondary side via the transformer T1. The alternating-current voltage with a rectangular waveform that appears on the secondary side is rectified and smoothed by the first diode D1 and the first output capacitor Co1, so that, as an output voltage Vout, a desired direct-current voltage appears at an output terminal P1. The first load L1 is connected to the output terminal P1.

To a feedback terminal FB (pin-2) of the control circuit 10, a feedback signal commensurate with the output voltage Vout is input via a feedback circuit 20, which includes a photocoupler Pc1. A capacitor C2 is provided for phase compensation.

The feedback circuit 20 will be described specifically. The feedback circuit 20 includes a shunt regulator Sr1, a photocoupler Pc1, and voltage-division resistors R21 and R22. The voltage-division resistors R21 and R22 divide the output voltage Vout at a voltage-division factor K. The shunt regulator Sr1 amplifies the deviation of the divided output voltage Vout' (=Vout×K) from a predetermined reference voltage (Vref), and outputs a current Ifb commensurate with the deviation. In the path of the output current Ifb of the shunt regulator Sr1, an input-side light-emitting diode of the photocoupler Pc1 is provided. The photocoupler Pc1 outputs to the feedback terminal FB of the control circuit 10 a feedback signal commensurate with the deviation of the output voltage Vout' from the reference voltage Vref. Resistors R23 and R24 are provided for proper biasing of the light-emitting diode in the photocoupler Pc1.

Fed with the feedback signal, the control circuit 10 generates a switching signal that adjusts pulses so as to make the output voltage Vout' equal to the reference voltage Vref, and drives, with the switching signal that it outputs from the output terminal OUT, the switching transistor M1. Let the factor of voltage division by the voltage-division resistors R21 and R22 be K, then, through feedback, the output voltage Vout is stabilized such that the equation below is fulfilled.

$$Vout=Vref/K$$

The switching transistor M1, the auxiliary winding N3, the second diode D2, and the second output capacitor Co2 constitute a second converter (auxiliary converter). Between one end of the auxiliary winding N3 and one end of the second output capacitor Co2, a second diode D2 is provided, with its cathode on the second output capacitor Co2 side. The other end of the auxiliary winding N3 and the other end of the second output capacitor Co2 are each grounded. To one end of the second output capacitor Co2, the second load L2 is connected.

To a power terminal VCC (pin-6) of the control circuit 10, one end of the second output capacitor Co2 is connected. A HIGH-voltage terminal VH (pin-8) of the control circuit 10 is connected to one end of a resistor R1 included in a current supplementing circuit 30. The control circuit 10 incorporates a start-up circuit 101 connected between the HIGH-voltage terminal VH and the power terminal VCC.

When the user turns on the power (turns on the alternating-current voltage Vac), the start-up circuit 101 supplies a current via the power terminal VCC, and thereby charges the second output capacitor Co2 and starts up the control circuit 10. After the start-up, the voltage appearing at the second output capacitor Co2 is applied as a supply voltage to the power terminal VCC. The start-up circuit 101 and the current supplementing circuit 30 will be described in detail later.

The voltage appearing at one end of the auxiliary winding N3 is input, via a low-pass filter constituted by a resistor R2 and a capacitor C3, to a ZT terminal (pin-1) of the control circuit 10.

<Configuration Example of the Control Circuit>

Figure 2:
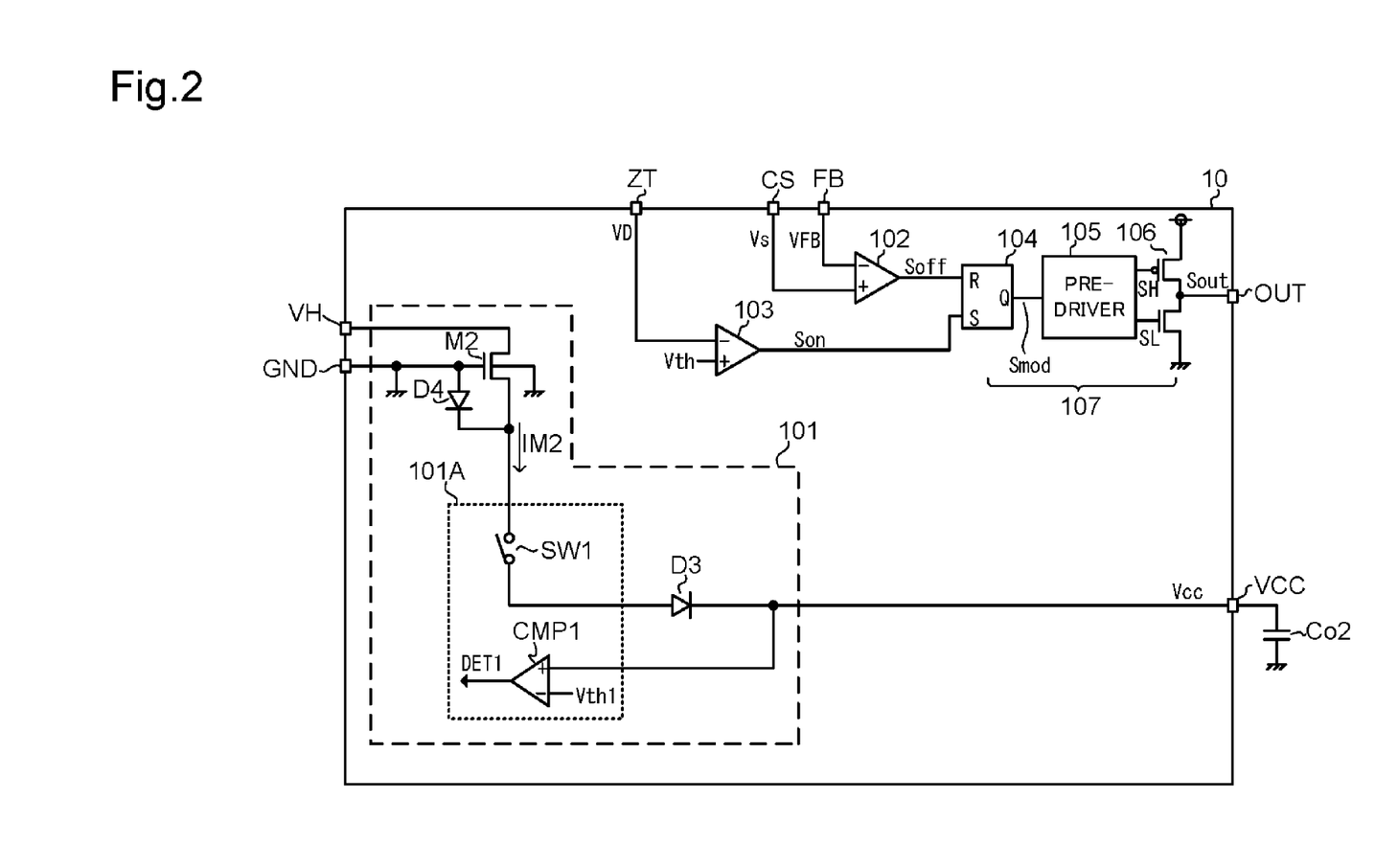
FIG. 2 is a diagram showing a configuration example of a control circuit in the electronic appliance of FIG. 1.

Next, a specific configuration example of the control circuit 10 will be described. A configuration example of the control circuit 10 is shown in FIG. 2. The control circuit 10 shown there includes a start-up circuit 101, an OFF signal generator 102, an ON signal generator 103, and a driving stage 107.

The OFF signal generator 102 includes a comparator that compares a detection signal Vs applied to the current sense terminal CS with the feedback signal VFB applied to the feedback terminal FB, and generates an OFF signal Soff that determines the time at which the switching transistor M1 turns OFF. The OFF signal Soff generated by the OFF signal generator 102 is asserted when the current Is through the switching transistor M1 reaches a level commensurate with the feedback signal VFB.

For example, when the output voltage Vout' becomes lower than the reference voltage Vref, the feedback signal VFB becomes higher; this delays the time at which the OFF signal Soff is asserted, and lengthens the ON period Ton of the switching transistor M1, with the result that feedback acts in such a direction as to increase the output voltage Vout. Reversely, when the output voltage Vout' becomes higher than the reference voltage Vref, the feedback signal VFB becomes lower; this hastens the time at which the OFF signal Soff is asserted, and shortens the ON period Ton of the switching transistor M1, with the result that feedback acts in such a direction as to decrease the output voltage Vout.

The ON signal generator 103 generates an ON signal Son that is asserted after the OFF signal Soff is asserted. The ON signal generator 103 includes a comparator that compares the voltage VD appearing at one end of the auxiliary winding N3 with a predetermined level Vth. The ON signal generator 103 asserts the ON signal Son when the voltage VD falls down to the predetermined level Vth.

When the switching transistor M1 turns ON, a current passes through the primary winding N1, and energy is stored in the transformer T1. Thereafter, when the primary winding N1 turns OFF, the energy stored in the transformer T1 is discharged. By monitoring the voltage VD appearing at the auxiliary winding N3, the ON signal generator 103 can detect complete discharge of energy out of the transformer T1. On detecting discharge of energy, the ON signal generator 103 asserts the ON signal Son to turn the switching transistor M1 back ON.

When the ON signal Son is asserted, the driving stage 107 turns ON the switching transistor M1; when the OFF signal Soff is asserted, the driving stage 107 turns OFF the switching transistor M1. The driving stage 107 includes a flip-flop 104, a pre-driver 105, and a driver 106. The flip-flop 104 receives, at its set and reset terminals, the ON signal Son and the OFF signal Soff respectively. The flip-flop 104 changes states according to the ON signal Son and the OFF signal Soff. As a result, the output signal Smod of the flip-flop 104 is modulated so as to make the output voltage Vout' equal to the target value Vref. In FIG. 2, the HIGH level of the output signal Smod and the switching signal Sout is associated with the ON state of the switching transistor M1, and their LOW level is associated with the OFF state of the switching transistor M1.

The pre-driver 105 drives the driver 106 according to the output signal Smod of the flip-flop 104. To prevent a high-side transistor and a low-side transistor in the driver 106 from turning ON simultaneously, the output signals SH and SL of the pre-driver 105 includes a dead time. The driver 106 outputs the switching signal Sout.

The start-up circuit 101 includes a charge transistor M2, diodes D3 and D4, and a current limiting circuit 101A. The charge transistor M2, which is an N-channel MOSFET, is provided between the HIGH-voltage terminal VH and the power terminal VCC, and is biased so as to be normally ON. Specifically, the gate and the backgate of the charge transistor M2 are connected to a ground terminal GND, and the drain of the charge transistor M2 is connected to the HIGH-voltage terminal VH. Between the gate and the source of the charge transistor M2, the diode D4 is connected. With the current limiting circuit 101A ignored, the higher the voltage Vcc at the power terminal VCC, the lower the current IM2 through the charge transistor M2, and the lower the voltage Vcc at the power terminal VCC, the higher the current IM2 through the charge transistor M2.

The current limiting circuit 101A includes a switch SW1 and a comparator CMP1. The switch SW1 is connected between the source of the charge transistor M2 and the anode of the diode D3. The cathode of the diode D3 is connected to the power terminal VCC. The comparator CMP1 compares the voltage Vcc at the power terminal VCC with a threshold voltage Vth1, and outputs a detection signal DET1 as the result of the comparison. According to the detection signal DET1, the switch SW1 is switched between ON and OFF.

The charge transistor M2, the switch SW1, and the diode D3 function as a charge circuit which charges the second output capacitor Co2 when the power is turned ON.

<Operation of the AC/DC Converter at Start-Up>

Figure 3:
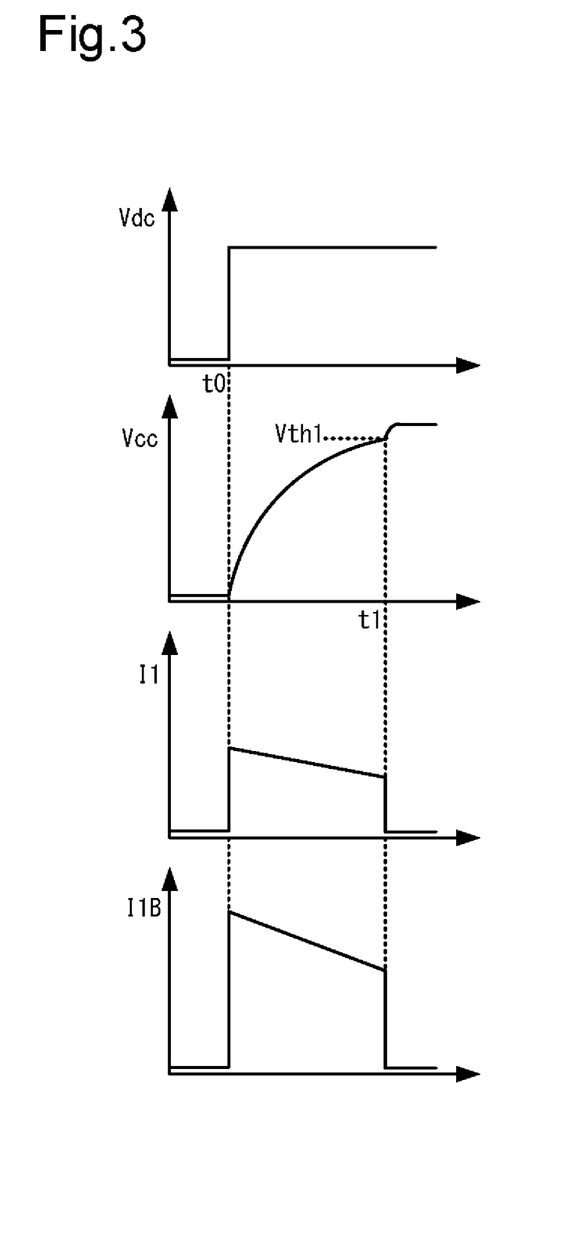
FIG. 3 is a timing chart showing an example of the waveforms of relevant voltages and currents at start-up as observed when the control circuit of FIG. 2 is used.

Next, the operation of the AC/DC converter 1 at start-up will be described with reference to FIGS. 3 and 4. FIG. 3 is a timing chart showing the waveforms of relevant voltages and currents at the start-up of the AC/DC converter 1. Up to time t0 in FIG. 3, the electronic appliance is OFF.

The current supplementing circuit 30 is configured as follows. The current supplementing circuit 30 includes a resistor R1 and a PNP transistor (bipolar transistor) Tr1. To the line at which the direct-current voltage Vdc appears, one end of the resistor R1 is connected, of which the other end is connected to the HIGH-voltage terminal VH. Of the PNP transistor Tr1, the emitter is connected to the just-mentioned line, the collector is connected to one end of the second output capacitor Co2, and the base is connected to the connection point between the resistor R1 and the HIGH-voltage terminal VH.

Figure 4:
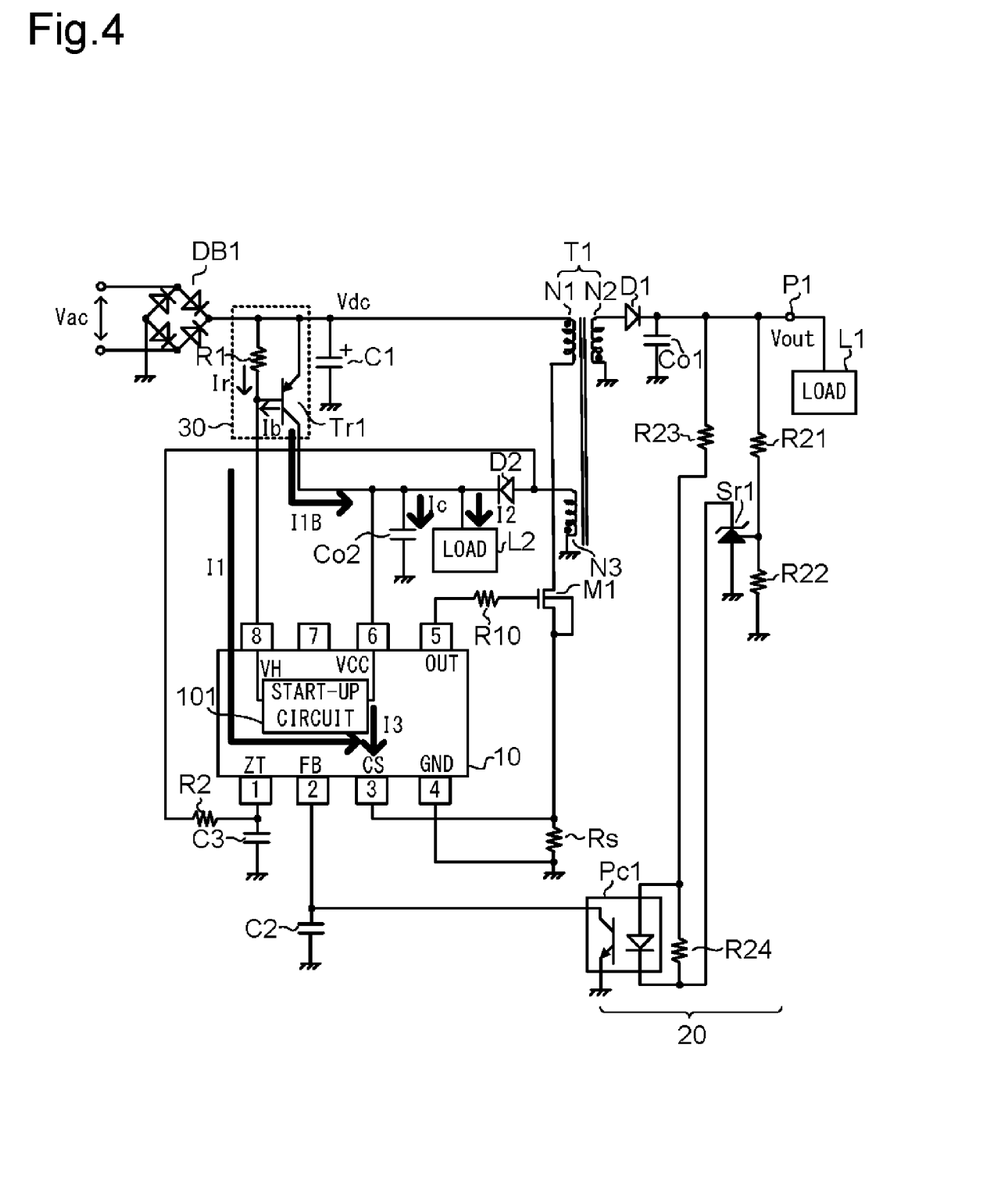
FIG. 4 is a diagram showing relevant currents occurring at start-up.

When, at time t0 in FIG. 3, the user turns on the power and the direct-current voltage Vdc rises, since the switch SW1 in the start-up circuit 101 is ON, a first current I1 passes from the HIGH-voltage terminal VH through the start-up circuit 101 (FIG. 4). The first current I1 is identical with the current IM2 in FIG. 2.

Here, a current Ir passes through the resistor R1 in the current supplementing circuit 30, and the voltage drop across the resistor R1 is applied between the emitter and base of the PNP transistor Tr1, so that a base current Ib passes (FIG. 4). The current Ir and the base current Ib together make the first current I1. The voltage drop (=R1·Ir) across the resistor R1 is higher than the threshold voltage of the PNP transistor Tr1, the PNP transistor Tr1 turns ON, and, as a collector current, a second current I1B passes (FIG. 4). The second current IB equals the base current Ib multiplied by the amplification factor Hfe, and acts as a current that supplements the first current I1.

Here, let the current consumed by the second load L2 be consumed current I2 and let the current diverted from the line connected to the power terminal VCC and consumed inside the control circuit 10 be consumed current I3 (FIG. 4), then the charge current Ic (FIG. 4) of the second output capacitor Co2 is given by the following equation.

$$Ic=(I1+I1B)-(I2+I3)$$

As a result of the second output capacitor Co2 being charged with the charge current Ic, the voltage Vcc at the power terminal VCC rises. Then, at time t1 in FIG. 3, when the voltage Vcc exceeds the threshold voltage Vth1, the detection signal DET1 output from the comparator CMP1 (FIG. 2) turns to HIGH level, and the switch SW1 turns OFF; thus, the first current I1 is shut off. Now, the currents Ir and Ib are zero, and this turns the PNP transistor Tr1 OFF and makes also the second current I1B zero.

The threshold voltage Vth1 can be set, for example, at the lowest voltage $V_{UVLO}$ (under voltage lock out) at which the control circuit 10 can operate. Then, when the voltage Vcc exceeds the threshold voltage Vth1, the control circuit 10 starts up, and the switching by the switching transistor M1 starts. As a result, by the second converter, the level of the voltage Vcc at the power terminal VCC is adjusted and stabilized. Here, the detection signal DET1 is kept at HIGH level, and thus the switch SW1 is kept OFF; accordingly, neither the first current I1 nor the second current I1B passes.

Thus, even when the second load L2 is connected to the AC/DC converter 1 on the primary side, the first current I1 is supplemented with the second current I1B, and this makes it possible to charge the second output capacitor Co2 and to start up the control circuit 10.

<Modified Example of the Start-Up Circuit>

Figure 5:
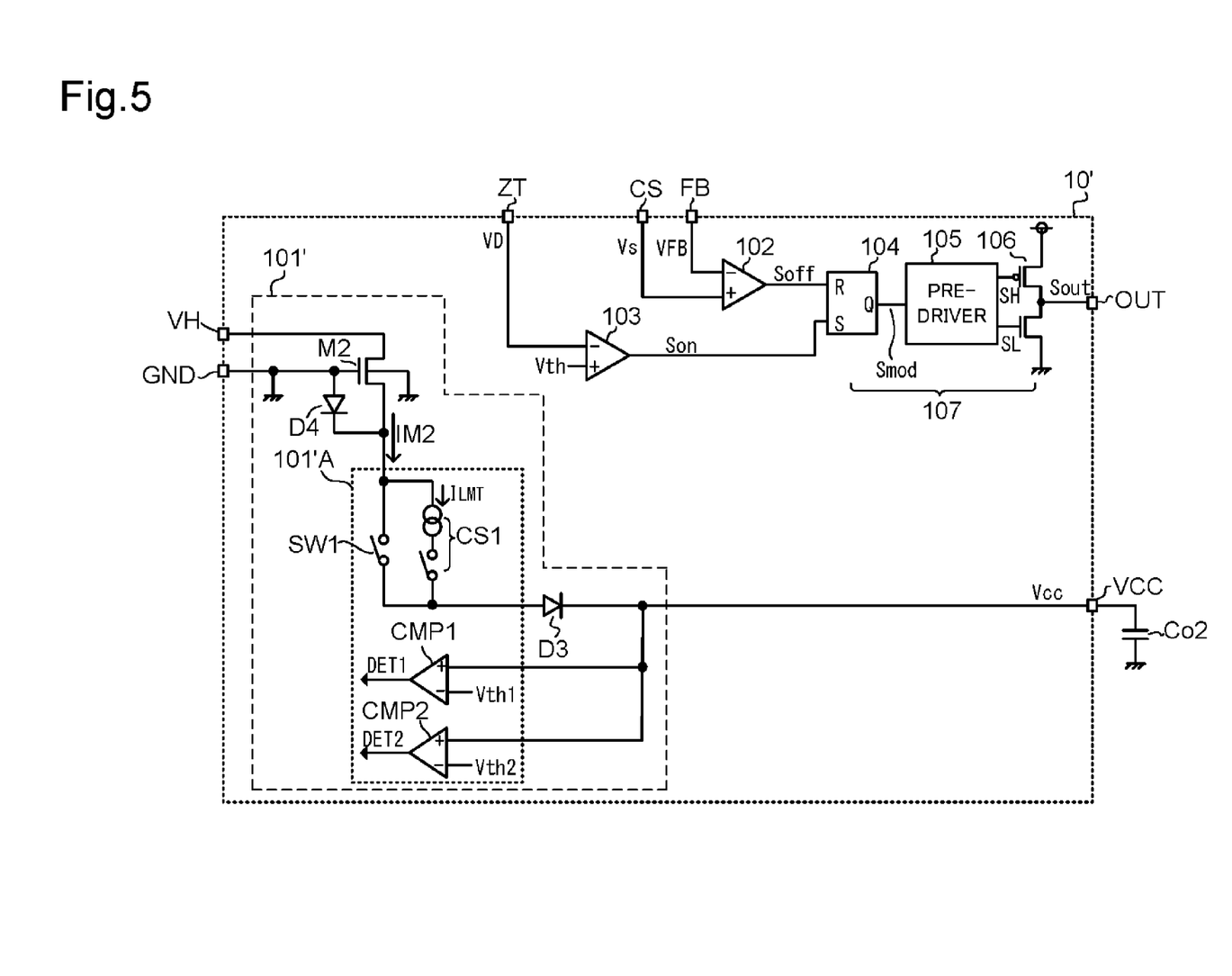
FIG. 5 is a diagram showing another configuration example of the control circuit in the electronic appliance of FIG. 1.

The configuration of a modified example of the start-up circuit provided in the control circuit 10 is shown in FIG. 5. The start-up circuit 101' shown in FIG. 5 differs from the one shown in FIG. 2 and described previously in the configuration of the current limiting circuit 101'A.

The current limiting circuit 101'A includes a current source (limit current source) CS1 connected in parallel with the switch SW1. The current source CS1 is configured to be switchable between ON and OFF, and, in the ON state, supplies a limit current $I_{LMT}$.

The current limiting circuit 101'A includes, in addition to the comparator CMP1, a comparator CMP2 that compares the voltage Vcc at the power terminal VCC with a threshold voltage Vth2 to output a detection signal DET2 as the result of the comparison. The threshold voltage Vth2 is a voltage lower than threshold voltage Vth1. According to the detection signals DET1 and DET2, the switch SW1 and the current source CS1 are switched between ON and OFF.

The operation of the AC/DC converter 1 at start-up when it uses the start-up circuit 101' according to the modified example will now be described with reference to a timing chart shown in FIG. 6.

Figure 6:
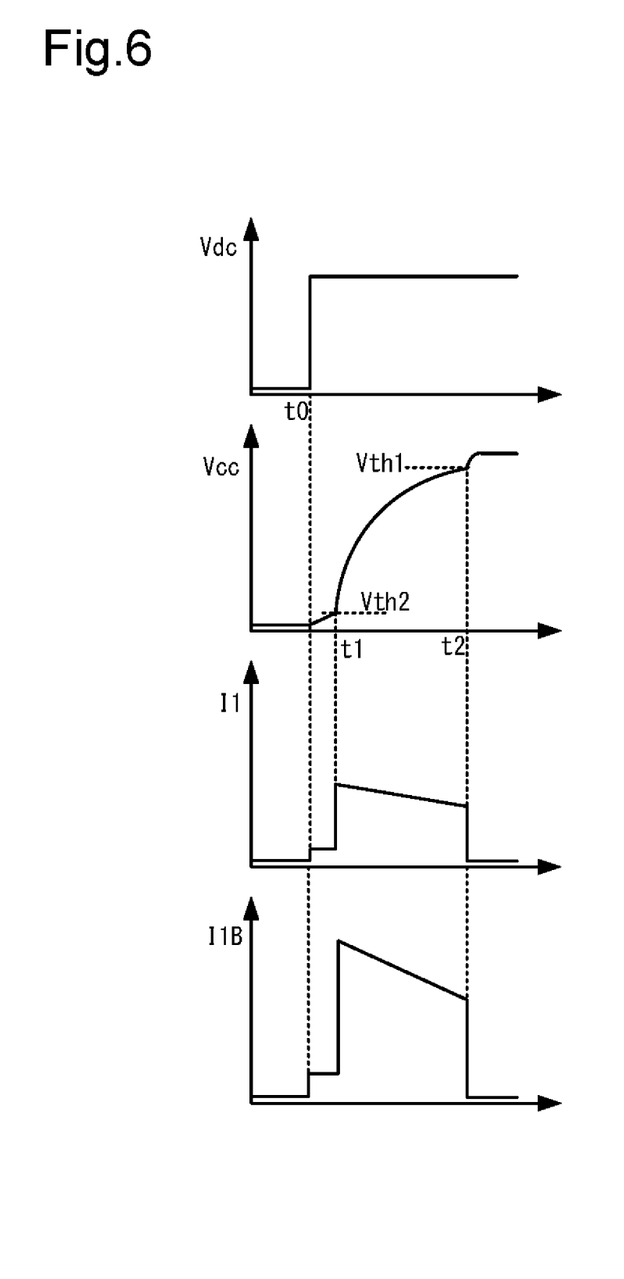
FIG. 6 is a timing chart showing an example of the waveforms of relevant voltages and currents at start-up as observed when the control circuit of FIG. 5 is used.

When, at time t0 in FIG. 6, the user turns on the power and the direct-current voltage Vdc rises, since the detection signals DET1 and DET2 are both at LOW level, the switch SW1 is OFF, and the current source CS is ON; thus, the limit current $I_{LMT}$ causes the first current I1 to pass. At this time, the voltage drop across the resistor R1 causes also the second current I1B to pass.

The second output capacitor Co2 is charged with the first and second currents I1 and I1B, and the voltage Vcc at the power terminal VCC rises. At time t1, when the voltage Vcc exceeds the threshold voltage Vth2, while the detection signal DET1 is at LOW level, the detection signal DET2 is at HIGH level; thus, at least the switch SW1 turns ON. As a result, the first and second currents I1 and I1B both increase, and as the charge current Ic of the second output capacitor Co2 increases, the voltage Vcc increases faster.

At time t2, when the voltage Vcc exceeds the threshold voltage Vth1, the detection signals DET1 and DET2 are both at HIGH level, and thus the switch SW1 and the current source CS1 both turn OFF. Thus, the first current I1 is shut off, and also the second current I1B becomes zero. At this time, the control circuit 10 starts up, so that the switching by the switching transistor M1 starts, and the voltage Vcc is stabilized by the second converter.

In an embodiment like the one described above, in particular when, after the voltage Vcc has stabilized, the power terminal VCC is short-circuited to ground, the detection signals DET1 and DET2 both turn to LOW level; thus, the switch SW1 turns off, and the current source CS1 turns ON. As a result, the first current I1 is limited to the limit current $I_{LMT}$, and also the second current I1B is limited. Thus, even if the state short-circuited to ground continues for a long time, it is possible to suppress the amount of heat generated and to enhance the reliability of the AC/DC converter 1.

<Examples of Application in Electronic Appliances>

Next, specific examples of application of the present invention in electronic appliances will be described. As one specific example of an electronic appliance, a configuration that can be adopted when the electronic appliance is an air conditioner is shown in FIG. 7.

Figure 7:
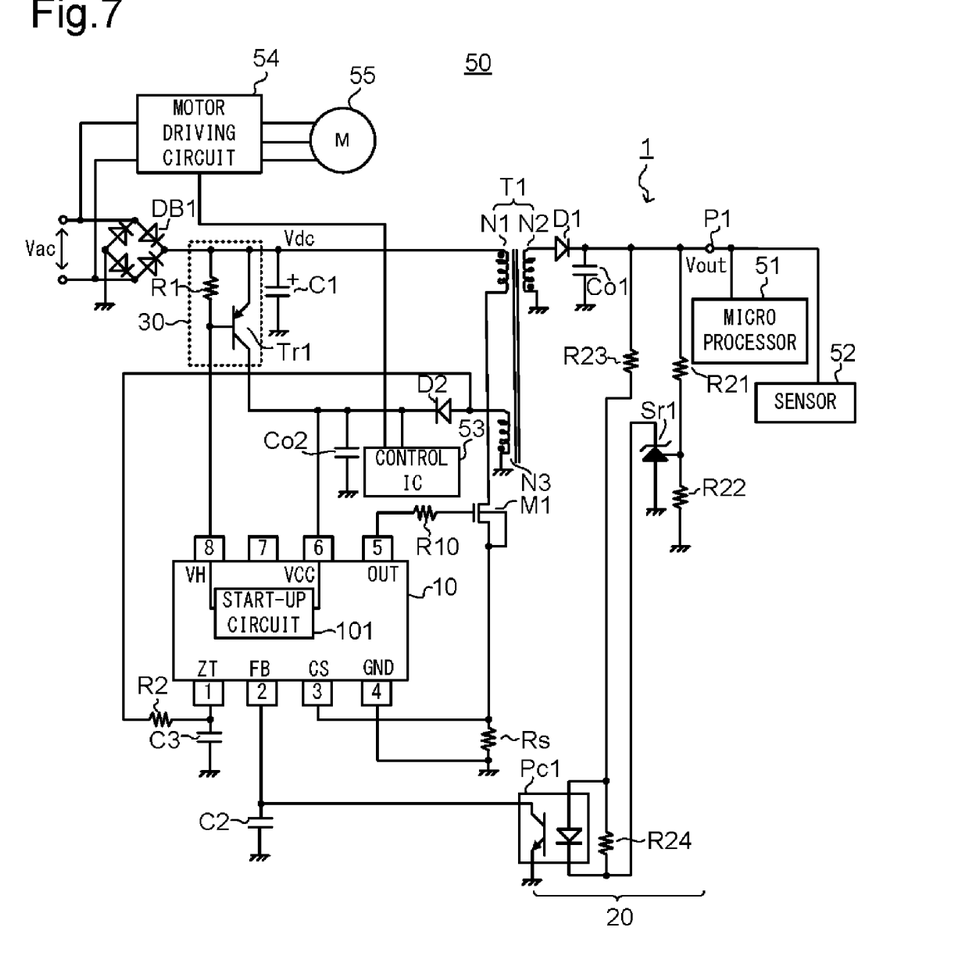
FIG. 7 is a diagram showing the configuration of an air conditioner as an example of application to an electronic appliance.

The air conditioner 50 shown in FIG. 7 includes the AC/DC converter 1 described previously, a microprocessor 51 and a sensor 52 as the first load L1 on the secondary side, a control IC 53 as the second load L2 on the primary side, a motor driving circuit 54, and a motor 55.

The microprocessor 51 and the sensor 52, such as a human presence sensor, need to be isolated, and are therefore arranged on the secondary side. The motor driving circuit 54 is a circuit that receives the alternating-current voltage Vac to drive and control a motor 55, and includes, for example, a power factor improving circuit, a voltage step-up circuit, and a switching output stage.

The control IC 53 for controlling the motor driving circuit 54 is arranged on the primary side for the sake of a simpler circuit configuration (if it is arranged on the secondary side, it requires a component such as a photocoupler). Even in a case as here where the control IC 53 as a load is connected on the primary side and it consumes current, the current supplementing circuit 30 supplements the current for start-up, and this makes it possible to charge the second output capacitor Co2 and to start up the control circuit 10.

Figure 8:
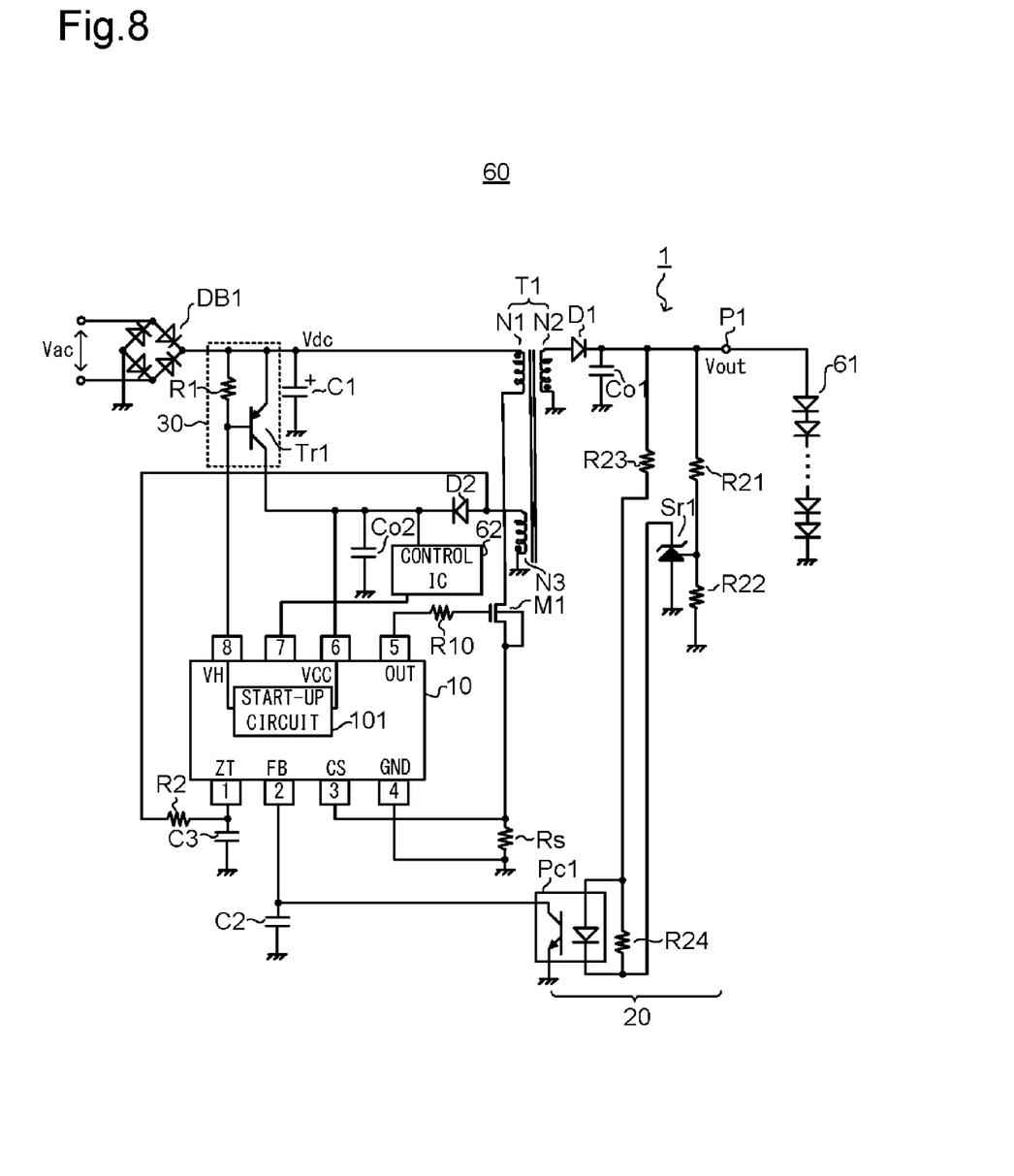
FIG. 8 is a diagram showing the configuration of an LED lighting device as an example of application to an electronic appliance.

As another specific example of an electronic appliance, a configuration that can be adopted when the electronic appliance is an LED (light-emitting diode) lighting device is shown in FIG. 8.

The LED lighting device 60 shown in FIG. 8 includes the AC/DC converter 1, an LED array 61 as the first load L1 on the secondary side, and a control IC 62 as the second load L2 on the primary side.

The control IC 62 feeds a dimming signal to the dimming terminal (pin-7) of the control circuit 10, and the control circuit 10, according to the dimming signal fed to it, adjusts pulses in the switching signal, thereby to dim the LED array 61. For the sake of a simple configuration, the control IC 62 is arranged on the primary side. Even in a case like here where the control IC 62 as a load is connected on the primary side and it consumes current, the current supplementing circuit 30 supplements the current for start-up, and this makes it possible to charge the second output capacitor Co2 and to start up the control circuit 10.

Switching power supply devices according to the present invention can be applied not only to AC/DC converters but also to, for example, DC/DC converters.

The various technical features disclosed herein may be implemented in any other manner than specifically described by way of embodiments above, and allows for many modifications within the scope of the technical ingenuity of the invention. That is, the embodiments described above should be considered to be in every aspect illustrative and not restrictive, and the technical scope of the present invention should be understood to be defined not by the description of embodiments given above but by the appended claims and to encompasses any modifications in the sense and scope equivalent to those of the claims.

INDUSTRIAL APPLICABILITY

The present invention finds applications as power supplies in a variety of electronic appliances such as air conditioners, lighting devices, and portable information terminals.

LIST OF REFERENCE SIGNS

1 AC/DC converter
DB1 diode bridge
C1 capacitor
T1 transformer
N1 primary winding
N2 secondary winding
N3 auxiliary winding
D1 first diode
Co1 first output capacitor
P1 output terminal
D2 second diode
Co2 second output capacitor
M1 switching transistor
Rs sense resistor
10 control circuit (control IC)
20 feedback circuit
30 current supplementing circuit
Pc1 photocoupler
Sr1 shunt regulator
Tr1 PNP transistor
R1 resistor
L1 first load L2 second load
101 start-up circuit
101A current limiting circuit

The invention claimed is:

1. A switching power supply device, comprising:
a transformer including:
a primary winding to one end of which an input voltage is applied;
a secondary winding; and
an auxiliary winding provided on a primary-winding side;
a switching element provided in a path of the primary winding;
an output capacitor having a potential at one end thereof fixed;
a rectifying element provided between another end of the output capacitor and one end of the auxiliary winding, with a cathode of the rectifying element on an output-capacitor side;
a control circuit controlling the switching element between ON and OFF, the control circuit including:
a power terminal connected to the other end of the output capacitor;
a HIGH-voltage terminal connected to an input side of the input voltage; and
a start-up circuit provided between the power terminal and the HIGH-voltage terminal, the start-up circuit passing a first current for charging the output capacitor via the power terminal; and
a current supplementing circuit receiving the input voltage and connected to the HIGH-voltage terminal, the current supplementing circuit passing a second current to the output-capacitor side based on the first current,
wherein a load is connectable to the other end of the output capacitor, and
wherein the current supplementing circuit includes:
a resistor element to one end of which the input voltage is applied and to another end of which the HIGH-voltage terminal is connected; and
a transistor of which a control end is connected to the another end of the resistor element, the transistor having the input voltage applied to a current-in end thereof, the transistor having a current-out end thereof connected to the other end of the output capacitor, and
wherein when, as a result of the output capacitor being charged, a voltage at the power terminal exceeds a first threshold voltage, the start-up circuit shuts off the first current, and
in response to the first current being shut off, the current supplementing circuit makes the second current substantially zero.

2. The switching power supply device of claim 1, wherein the transistor is a PNP transistor of which
a base is the control end,
an emitter is the current-in end, and
a collector is the current-out end.

3. The switching power supply device of claim 1, wherein the start-up circuit includes:
a charge transistor provided between the HIGH-voltage terminal and the power terminal;
a first comparison circuit comparing the voltage at the power terminal with the first threshold voltage; and
a switch provided in a path of the charge transistor, the switch being switched according to a result of comparison by the first comparison circuit.

4. The switching power supply device of claim 3, wherein the start-up circuit further includes:
a second comparison circuit comparing the voltage at the power terminal with a second threshold voltage lower than the first threshold voltage; and
a current source connected in parallel with the switch, the current source limiting a current, and
the switch and the current source are switched between ON and OFF according to results of comparison by the first and second comparison circuits.

5. The switching power supply device of claim 3, wherein the charge transistor is an N-channel MOSFET biased so as to be normally ON.

6. An electronic appliance, comprising:
the switching power supply device of claim 1; and
wherein the load is connected to the other end of the output capacitor in the switching power supply device.

7. The electronic appliance of claim 6, wherein
the switching power supply device is an AC/DC converter,
the electronic appliance is an air conditioner further including:
a motor; and
a motor driving circuit receiving an alternating-current voltage to drive and control the motor, and
the load is a control circuit that controls the motor driving circuit.

8. The electronic appliance of claim 6, wherein the electronic appliance is an LED lighting device further including:
an LED load connected on a secondary side of the transformer in the switching power supply device,
the control circuit of the switching power supply device has a function of dimming the LED load, and
the load is a control circuit that feeds the control circuit with a dimming signal.

* * * * *